United States Patent [19]

Lubowitz et al.

[11] Patent Number: 5,239,046

[45] Date of Patent: Aug. 24, 1993

[54] AMIDEIMIDE SIZING FOR CARBON FIBER

[75] Inventors: Hyman R. Lubowitz, Rolling Hills Estates, Calif.; Clyde H. Sheppard, Bellevue; Ronald R. Stephenson, Kirkland, both of Wash.

[73] Assignee: The Boeing Company, Seattle, Wash.

[21] Appl. No.: 934,768

[22] Filed: Aug. 24, 1992

Related U.S. Application Data

[60] Division of Ser. No. 345,062, Apr. 28, 1989, Pat. No. 5,155,206, which is a continuation-in-part of Ser. No. 181,013, Apr. 13, 1988, Pat. No. 5,104,967, which is a continuation-in-part of Ser. No. 92,740, Sep. 3, 1987, abandoned.

[51] Int. Cl.$^5$ .................. C08C 73/14; C08K 5/20; B32B 9/00
[52] U.S. Cl. .................. 528/322; 528/125; 528/126; 528/128; 528/170; 528/171; 528/172; 528/173; 528/176; 528/179; 528/188; 528/207; 528/208; 528/223; 528/226; 528/229; 528/350; 528/353; 526/263; 526/285; 428/367; 428/375
[58] Field of Search .............. 528/322, 125, 126, 128, 528/170, 171, 172, 173, 176, 179, 188, 207, 208, 223, 229, 226, 350, 353; 428/367, 375

[56] References Cited

U.S. PATENT DOCUMENTS

| | | | |
|---|---|---|---|
| 3,105,839 | 10/1963 | Renner | 528/361 |
| 3,453,236 | 7/1969 | Culbertson | 528/128 |
| 3,658,938 | 4/1972 | Kwiatkowski et al. | 528/172 |
| 3,689,464 | 9/1972 | Holub et al. | 528/350 |
| 3,781,249 | 12/1973 | Lubowitz et al. | 528/350 |
| 3,895,064 | 7/1975 | Brode et al. | 564/315 |
| 3,988,374 | 10/1976 | Brode et al. | 528/173 |
| 3,993,630 | 11/1976 | Darmory et al. | 528/229 |
| 4,158,731 | 6/1979 | Baumann et al. | 528/322 |
| 4,172,836 | 10/1979 | Baumann et al. | 548/546 |
| 4,251,417 | 2/1981 | Chow et al. | 528/125 |
| 4,251,420 | 2/1981 | Antonoplos et al. | 528/125 |
| 4,302,575 | 11/1981 | Takekoshi | 528/185 |
| 4,358,561 | 11/1982 | Keske et al. | 524/600 |
| 4,381,363 | 4/1983 | Reinhart, Jr. | 528/125 |
| 4,418,181 | 11/1983 | Monacelli | 528/125 |
| 4,536,559 | 8/1985 | Lubowitz et al. | 528/170 |
| 4,599,383 | 7/1986 | Satoji | 525/180 |
| 4,604,437 | 8/1986 | Renner | 528/322 |
| 4,628,079 | 12/1986 | Zecher et al. | 528/49 |
| 4,764,427 | 8/1988 | Hara et al. | 428/367 |
| 4,861,855 | 8/1989 | Bockrath et al. | 528/125 |
| 4,923,752 | 5/1990 | Cornelia | 428/367 |
| 4,927,899 | 5/1990 | Michaud et al. | 528/49 |
| 4,927,900 | 5/1990 | Michaud et al. | 528/49 |

FOREIGN PATENT DOCUMENTS

| | | |
|---|---|---|
| 1269576 | 5/1990 | Canada. |
| 0175484 | 3/1986 | European Pat. Off.. |
| 0289798 | 11/1988 | European Pat. Off.. |
| 0305882 | 3/1989 | European Pat. Off.. |
| 0334778 | 9/1989 | European Pat. Off.. |
| 0336856 | 10/1989 | European Pat. Off.. |
| 2210635 | 12/1973 | France. |
| 1453625 | 10/1976 | United Kingdom. |

OTHER PUBLICATIONS

Chemical Abstracts, Abstract No. 39809y, vol. 97, No. 6, Aug. 9, 1982, p. 30.
Chemical Abstracts, Abstract No. 44094f, (equivalent to GB 1,453,625).
Database WPIL Abstract No. 75-77887w (47), 1975, Derwent Pub. Ltd., London, GB; & JP-A-50102595 (Toray) Aug. 15, 1975.

Primary Examiner—John Kight, III
Assistant Examiner—P. Hampton-Hightower
Attorney, Agent, or Firm—Senniger, Powers, Leavitt & Roedel

[57] ABSTRACT

Sizing for carbon fibers with uncapped or capped linear polyamideimides.

The uncapped linear polyamideimides useful as carbon fiber sizings generally contain repeating units having the general formula:

(Abstract continued on next page.)

-continued

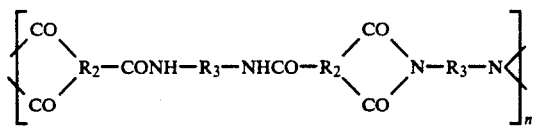

Wherein
- $R_2$ = a trivalent organic radical and generally benzenetriyl;
- $R_3$ = a divalent organic radical; and
- n = an integer sufficiently large to provide a strong, tough coating.

Useful capped, linear polyamideimide oligomers may be formed by including end caps with an unsaturated functionality (Y) containing a residue selected from the group consisting of:

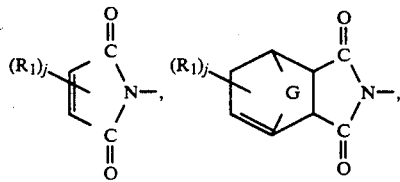

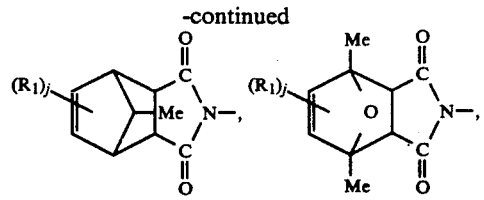

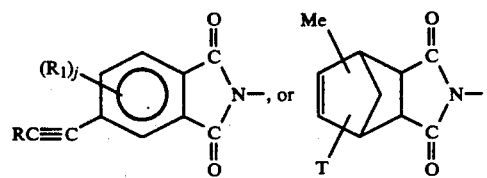

wherein
- $R_1$ = lower alkoxy, aryl, aryloxy, substituted alkyl, substituted aryl, halogen, or mixtures thereof;
- j = 0, 1, or 2;
- i = 1 or 2;
- G = —$CH_2$—, —O—, —S—, —$SO_2$—, —SO—, —CO—, —CHR—, or —$CR_2$—;
- T = methallyl or allyl;
- Me = methyl; and
- R = hydrogen, lower alkyl, or phenyl.

Prepregs and composites having carbon fibers sized with such polyamideimides are also described.

15 Claims, 1 Drawing Sheet

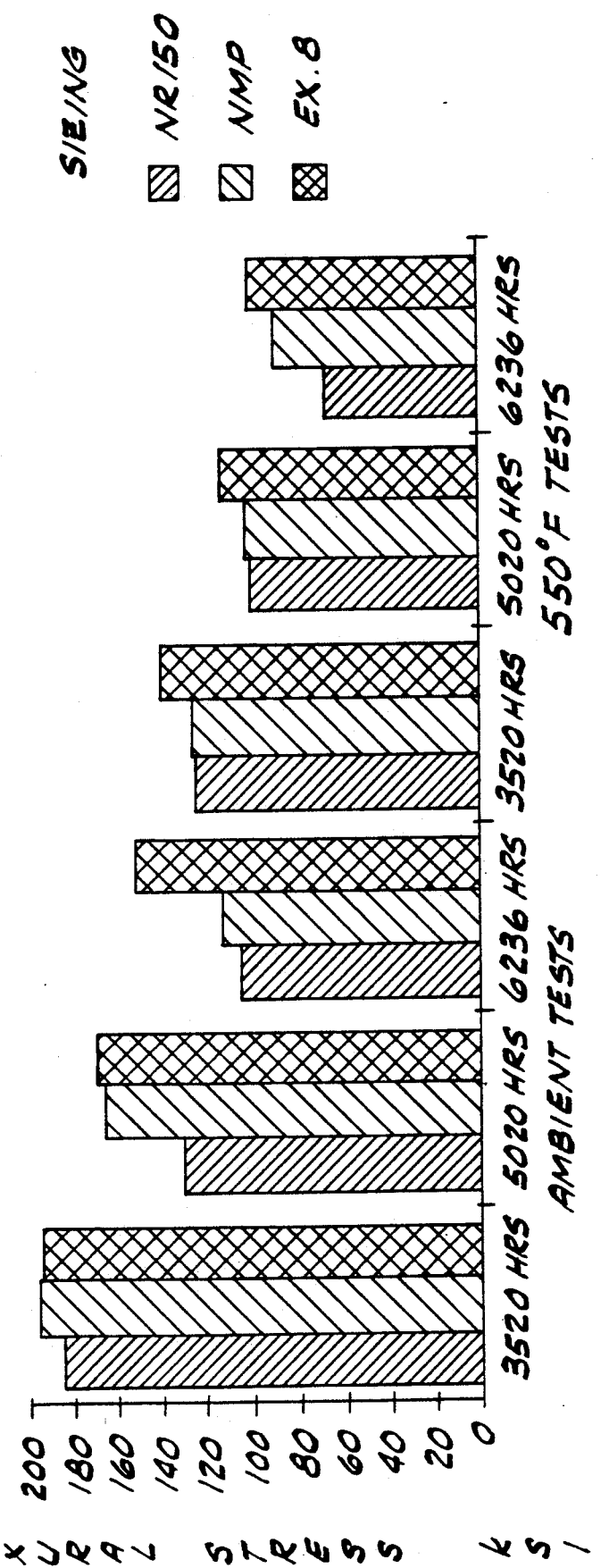

AMIDEIMIDE SIZING FOR CARBON FIBER

REFERENCE TO RELATED APPLICATIONS

This application is a divisional application based upon U.S. application Ser. No. 07/345,062, filed Apr. 28, 1989 now U.S. Pat. No. 5,155,206 which is a continuation-in-part application based upon U.S. application Ser. No. 07/181,013 incorporated by reference), filed Apr. 13, 1988, now U.S. Pat. No. 5,104,967 which is a continuation-in-part application based upon U.S. application Ser. No. 07/092,740, filed Sep. 3, 1987, now abandoned.

TECHNICAL FIELD

The present invention relates to polyamideimides useful as sizings to improve the mechanical and environmental stability of carbon fiber/oligomer composites, especially at elevated temperatures where these composites are most likely to find their use.

BACKGROUND OF THE INVENTION

Recently, chemists have sought to synthesize oligomers for high performance advanced composites suitable for aerospace applications. These composites should exhibit solvent resistance, be strong, tough, and impact resistant; be easy to process; and be thermoplastic. Oligomers and composites that have thermooxidative stability, and, accordingly, can be used at elevated temperatures are particularly desirable.

While epoxy-based composites are suitable for many applications, their brittle nature and susceptibility to degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°-625° F., since they have glass transition temperatures of about 690° F. PMR-15, however, suffers from brittleness.

There has been a progression of polyimide sulfone compounds synthesized to provide unique properties or combinations of properties. For example, Kwiatkowski and Brode synthesized maleic-capped linear polyarylimides as disclosed in U.S. Pat. No. 3,839,287. Holub and Evans synthesized maleic- or nadic-capped, imido-substituted polyester compositions as disclosed in U.S. Pat. No. 3,729,446. Monacelli proposed tetra-maleimides made through an amic acid mechanism with subsequent ring closure, as shown in U.S. Pat. No. 4,438,280 or 4,418,181. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "starburst" multidimensional oligomers. We have shown surprisingly high glass transition temperatures yet reasonable ease of processing and desirable physical properties in many of these oligomers and their composites.

Polybenzoxazoles or their corresponding heterocycles, such as those disclosed in our U.S. Pat. No. 4,965,336 (to Lubowitz & Sheppard) and U.S. Pat. No. 4,868,270 (to LUbowitz, Shepaard, and Stephenson), may be used at temperatures up to about 750°-775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in our copending applications U.S. Ser. Nos. 07/000,605 filed Jan. 5, 1987; 07/167,656; and 07/176,518 have superior processing ease than some advanced composite oligomers since they can be handled at lower temperatures. Upon curing, however, the phenylimide end caps crosslink so that the thermal resistance and stiffness of the resulting composite is markedly increased. This increase is obtained with only a minor loss of matrix stress transfer (impact resistance), toughness, elasticity, and other mechanical properties. Glass transition temperatures above 850° F. are achievable.

Commercial polyesters, when combined with well-known reactive diluents, such as styrene, exhibits marginal thermal and oxidative resistance, and are useful only for aircraft or aerospace interiors. Polyarylesters are often unsatisfactory, also, since the resins often are semicrystalline which may make them insoluble in useable laminating solvents, intractable in fusion under typical processing conditions, and difficult and expensive to manufacture because of shrinking and/or warping. Those polyarylesters that are soluble in conventional laminating solvents remain so in composite form, thereby limiting their usefulness in structural composites. The high concentration of ester groups contributes to resin strength and tenacity, but also tends to make the resin susceptible to the damaging effects of water absorption. High moisture absorption by commercial polyesters can lead to lowering of the glass transition temperature leading to distortion of the composite when it is loaded at elevated temperature.

High performance, aerospace, polyester advanced composites, however, can be prepared using crosslinkable, end capped polyesterimide ethersulfone oligomers that have an acceptable combination of solvent resistance, toughness, impact resistance, strength, ease of processing, formability, and thermal resistance. By including Schiff base (—CH=N—) linkages in the oligomer chain, the linear, advanced composites formed with polyester oligomers of our copending application U.S. Ser. No. 07/137,493 filed Dec. 23, 1987 now abandon can have semiconductive or conductive properties when appropriately doped or reacted with appropriate metal salts.

Conductive and semiconductive plastics have been extensively studied (see, e.g., U.S. Pat. Nos. 4,375,427; 4,338,222; 3,966,987, 4,344,869; and 4,344,870), but these polymers do not possess the blend of properties which are essential for aerospace applications. That is, conductive polymers do not possess the blend of (1) toughness, (2) stiffness, (3) ease of processing, (4) impact resistance (and other matrix stress transfer capabilities), (5) retention of properties over a broad range of temperatures, and (6) thermooxidative resistance that is desirable in aerospace advanced composites. The prior art composites are often too brittle.

Thermally stable multidimensional oligomers having semiconductive or conductive properties when doped with suitable dopants are also known and are described in our copending applications (including U.S. Ser. No. 06/773,381 filed Sep. 5, 1985, abandoned and 07/212,404 to Lubowitz, Sheppard and Torre). The linear arms of the oligomers contain conductive linkages, such as Schiff base (—N=CH—) linkages, between aromatic groups Sulfone and ether linkages are interspersed in the arms. Each arm is terminated with a mono- or difunctional end cap (i.e. an end cap having one or two crosslinking functionalities) to allow controlled crosslinking upon heat-induced or chemically-induced curing. Other "semiconductive" oligomers are described in our other copending applications.

Polyamide oligomers and blends are described in U.S. Pat. Nos. 4,935,523; 4,847,333; and 4,876,328, and polyetherimide oligomers and blends are described in U.S. Pat. No. 4,851,495.

Polyamideimides are generally injection-moldable, amorphous, engineering thermoplastics which absorb water (swell) when subjected to humid environments or when immersed in water. Polyamideimides are generally described in the following patents: U.S. Pat. No. 3,658,938; 4,628,079; 4,599,383; 4,574,144; or 3,988,374. The thermal integrity and solvent-resistance can be greatly enhanced by capping amideimide backbones with monomers that present one or two crosslinking functionalities at each end of the oligomer, as will be described.

Advanced composite blends, as we use that term, contain a blend of at least one oligomer from one chemical family and at least one polymer from a different chemical family. These advanced composite blends yield composites that possess properties intermediate to the properties of composites made from either pure component. For example, a polybenzoxazole oligomer can be blended with a polyethersulfone polymer to improve the flexibility (reduce the stiffness) of the resulting composite without significant reduction of the other, desired, high performance properties of the heterocycle (i.e. oxazole). We described these advanced composite blends in U.S. Ser. No. 07/167,604, abandoned in favor of U.S. Ser. No. 07/619,677, filed Nov. 29, 1990.

A major problem encountered in improving high temperature mechanical and physical properties of reinforced resin, composites occurs due to inadequate transfer of induced matrix stress to the reinforcement. The matrix also helps to prevent the fiber from buckling. Sizing is often applied to the reinforcing fibers to protect the fibers during processing and to enhance bonding at this interface between the fibers and the resin matrix thereby more efficiently transferring the load and stabilizing the fiber. Sizings are essentially very thin films of resin (less than a few wt %) applied to the fibers. To be effective, they should be relatively high MW materials that form a relatively uniform coating. Commercially available sizings include epoxy sizings under the trade designations UC309 and UC314 from Amoco, G or W from Hercules, EP03 from Hoechst and high performance sizings under the trade designations L30N, L20N, UC0121 or UC0018 from Amoco. Commercially available sizings are unsatisfactory because they are generally monomers or low MW materials that often only partially coat the fibers and, as a result, minimally improve composite properties. There is a need, therefore, for improved sizings, especially for carbon fibers intended for high performance composites.

SUMMARY OF THE INVENTION

A family of polyamideimide sizings is provided that improve the thermooxidative and thermomechanical stability of reinforced resin composites, especially those advanced composites which use high performance resins (like polyimides) and high strength carbon fibers. Additional matrix resins include polyamide, polyamideimide, polyphenylene sulfide, polyquinoxaline, polyester, polysulfone, polyethersulfone, polysulfoneimide, and polybenzoxazole and other heterocycle resins or oligomers.

These sizings are linear polyamideimides and may be uncapped or capped with mono- or difunctional crosslinking end caps (i.e. caps having one or two crosslinking functionalities), and are generally prepared, for example, by condensing suitable acid halide anhydrides and diamines. The uncapped linear polyamideimides useful as carbon sizings generally contain repeating units having the general formula:

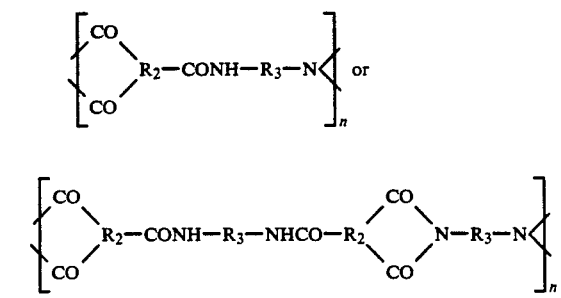

wherein $R_2$ = a trivalent organic radical and generally benzenetriyl;

$R_3$ = a divalent organic radical; and n = an integer sufficiently large to provide a strong, tough coating.

The resulting polyamideimide should have an average formula weight above 10,000, preferably above 20,000, and more preferably as high as one can achieve. Polyamideimides containing such repeating units may be prepared, for example, by condensing trimellitic anhydride acid chloride with a diamine such as bis(4-aminophenoxyphenyl) sulfone.

Useful capped, linear polyamideimide oligomers may be formed by including in the reaction mixture end caps which include hydrocarbon unsaturation, such as a residue (Y) selected from the group consisting of:

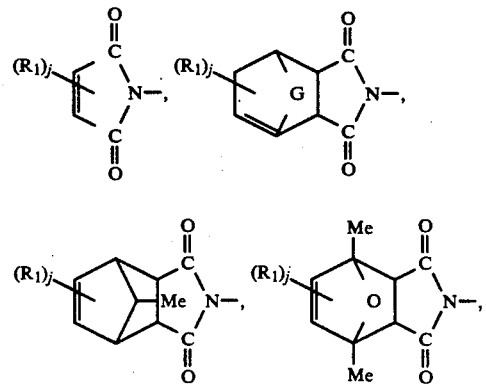

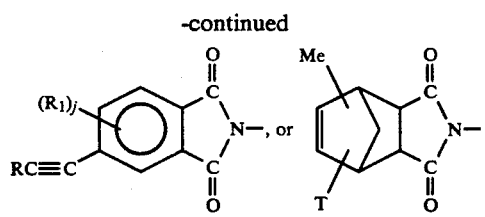

wherein $R_1$ = lower alkyl, lower alkoxy, aryl, aryloxy, substituted alkyl, substituted aryl, (either including hydroxyl or halo-substituents), halogen, or mixtures thereof;

j = 0, 1, or 2;

G = —$CH_2$—, —O—, —S—, —$SO_2$—, —SO—, —CHR—, —CO—, or —$CR_2$—;

R = hydrogen, lower alkyl, or phenyl;

T = methallyl or allyl; and

Me = methyl. For these capped polyamideimide oligomers, the average formula weight should generally be in the range of about 10,000–50,000 ensure that there is an adequate amount of crosslinking caps in the oligomers. Ideally these oligomers are in the range between 20,000–40,000.

Such uncapped and capped polyamideimides provide useful sizings that improve the mechanical and environmental stability of carbon fiber composites at elevated temperatures. In practicing the invention, carbon fibers are sized with the capped or uncapped polyamideimides, the sized carbon fibers are impregnated with a matrix in resin, reactive monomer, or oligomer form to form a prepreg, and the prepreg is cured to form a reinforced composite having improved stability.

BRIEF DESCRIPTION OF THE DRAWING

FIG. 1 is a graphical representation of the mechanical properties of composites with carbon fibers sized with conventional polyimide sizings and with a polyamideimide sizing of the present invention.

BEST MODE CONTEMPLATED FOR THE INVENTION

Polyamideimides of the present invention comprise a broad family of linear oligomers having one or two crosslinking fuctionalities on each end of the molecule. The crosslinking functionalities (Y) include residues selected from the group consisting of:

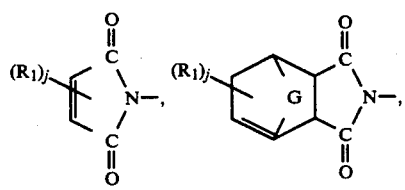

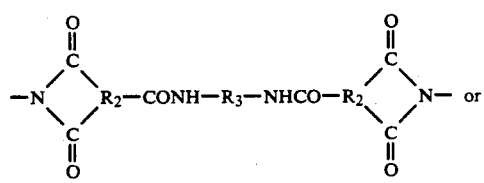

wherein $R_1$ = lower alkyl, lower alkoxy, aryl, aryloxy, substituted alkyl, substituted aryl, (either including hydroxyl or halo-substituents), halogen, or mixtures thereof;

j = 0, 1, or 2;

G = —$CH_2$—, —O—, —S—, —$SO_2$—, —SO—, —CO—, —CHR—, or —$CR_2$—;

R = hydrogen, lower alkyl, or phenyl; T = methallyl or allyl; and

Me = methyl.

The amideimides are characterized by backbones of two general types, namely:

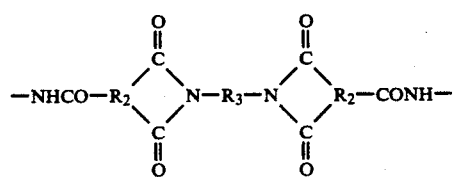

wherein $R_3$ = an aromatic, aliphatic, or alicyclic radical, and preferably a phenoxyphenyl sulfone; and $R_2$ = a trivalent organic radical, and preferably phenyl.

Accordingly, preferred linear polyamideimides include oligomers of the general formula:

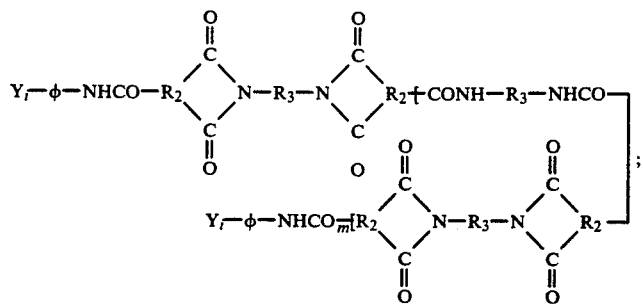

(a)

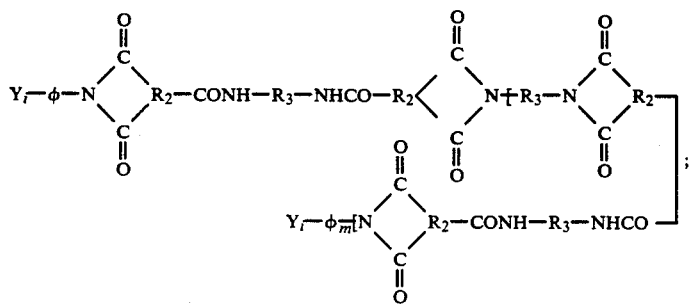

(b)

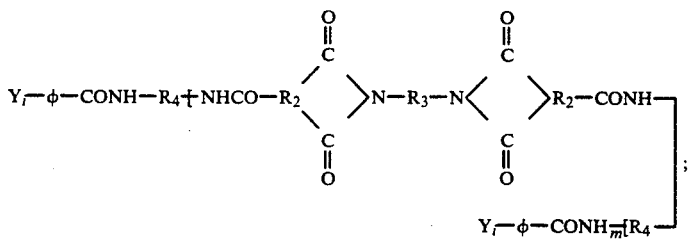

(c)

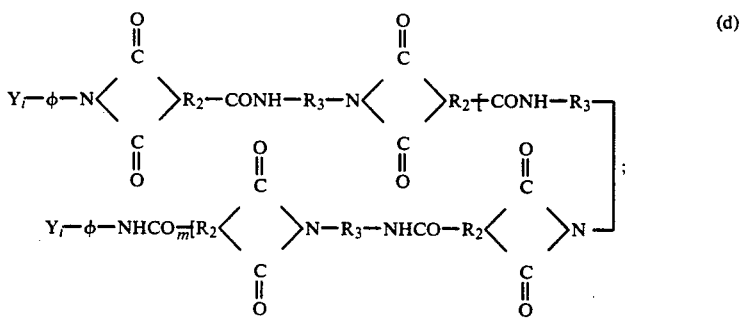

(d)

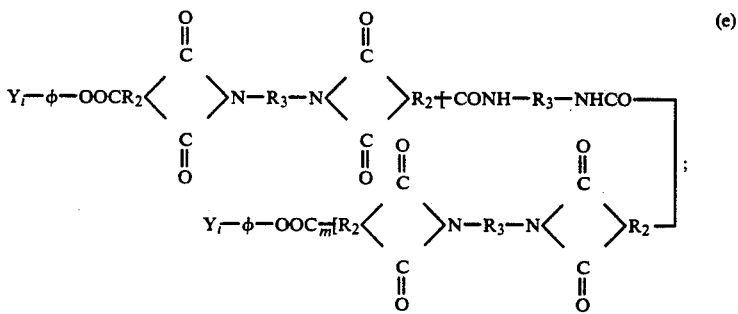

(e)

wherein Y, $R_2$, and $R_3$ are as previously defined, $R_4$ = a divalent organic radical, m = a small integer, usually from 0-5, but generally sufficiently large to impart thermoplastic properties in the oligomer, and $\phi$ = phenyl. Analogous polymers (compounds lacking the crosslinking end cap functionalities) also can be used as sizings with good results.

The amideimide oligomers are generally made by condensing suitable end cap monomers, diacid halides, diamines, and dianhydrides. The dianhydrides can be prepared by condensing 2 moles of an acid halide anhydride of the formula:

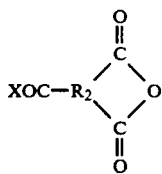
with a diamine of the formula: $H_2N-R_3-NH_2$. The diamine, in this case, can be selected from the group consisting of:
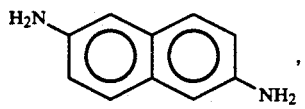
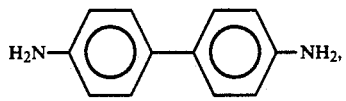
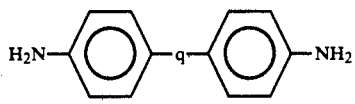
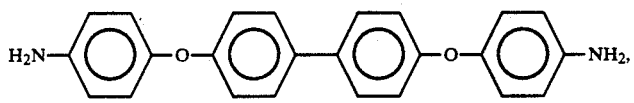
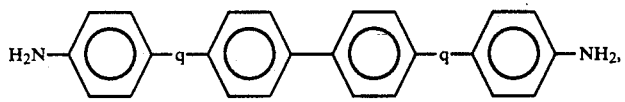
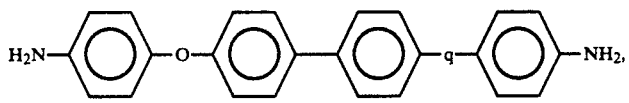
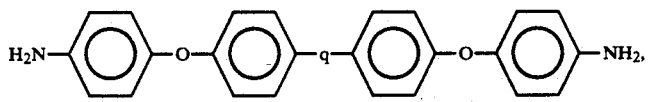
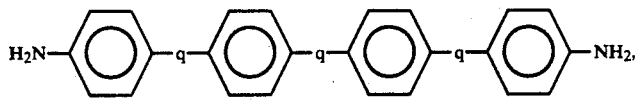
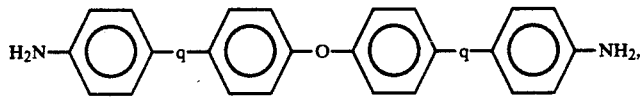
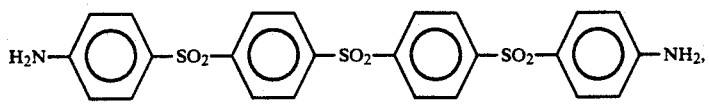

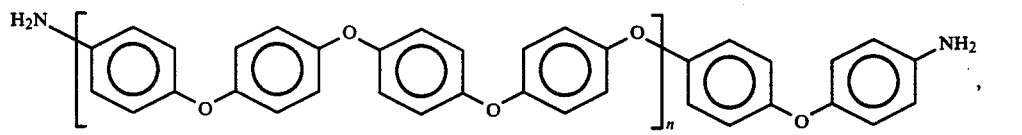

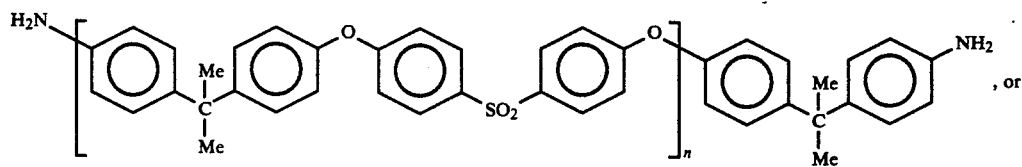

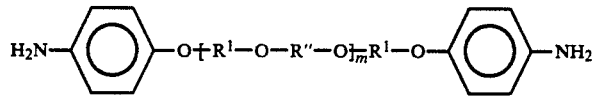

wherein $R^1 =$ 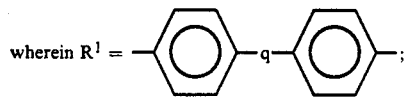;

$R'' =$ 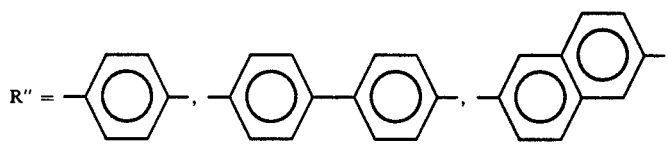

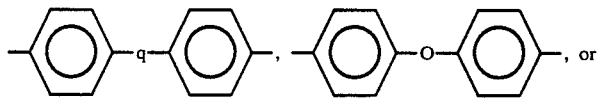

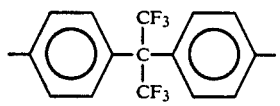

q = —SO$_2$—, —CO—, —S—, or —(CF$_3$)$_2$C—;
Me = methyl;
m = a small integer; and
D = —CO—, —SO$_2$—, —(CF$_3$)$_2$C— or mixtures thereof.

Other diamines that may be used, but that are not preferred, include those described in U.S. Pat. Nos. 4,504,632; 4,058,505; 4,576,857; 4,251,417; and 4,215,418. The aryl or polyaryl "sulfone" diamines previously described are preferred, since these diamines are soluble in conventional synthetic solvents and provide high thermal stability to the resulting oligomers and composites.

Particularly preferred ethersulfone (i.e. phenoxyphenyl sulfone) diamines are those in which $R_1$ is

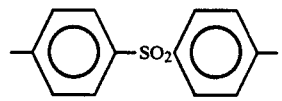

and R" is

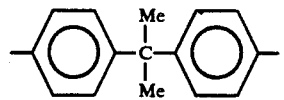

so that the phenoxyphenyl sulfone diamines include:

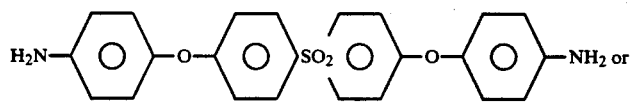

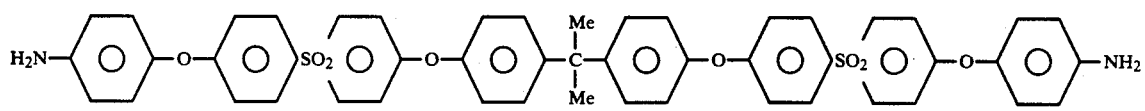

The molecular weights of these diamines can be easily varied from approximately 500 to about 2000. Using lower molecular weight diamines with alternating ether "sulfone" segments in the backbone, such as the phenoxyphenyl sulfone diamine set forth above, is particularly preferred since this compound improves the ease of processing of the amideimide by improving its solubility in conventional solvents.

Phenoxyphenyl sulfone diamines of this general nature can be prepared by reacting two moles of aminophenol with (n+1) moles of an aryl radical having terminal, reactive halide functional groups (dihalogens), such as 4,4'-dichlorodiphenyl sulfone, and a suitable bisphenol (i.e., dihydric phenol or diol). The bisphenol is preferably selected from the group consisting of:
2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane:
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;
or mixtures thereof, as disclosed in U.S. Pat. No. 3,262,914. Bisphenols having aromatic character (i.e., absence of aliphatic segments), such as bisphenol-A, are preferred.

The dihalogens in this circumstance preferably are selected from the group consisting of:

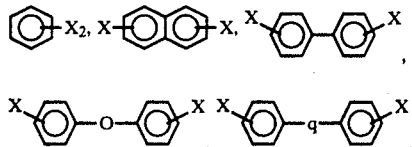

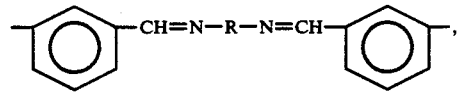

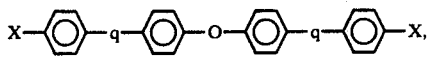

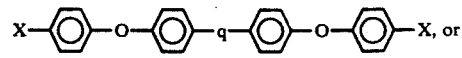

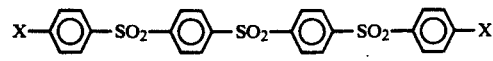

wherein
X=halogen, preferably chlorine; and
q=—S—, —SO$_2$—, —CO—, —(CH$_3$)$_2$C—, and —(CF$_3$)$_2$C—, and preferably either —SO$_2$— or —CO—.

The condensation reaction creates ether diamines that ordinarily include intermediate "sulfone" linkages. The condensation generally occurs through a phenate mechanism in the presence of K$_2$CO$_3$ or another base in a DMSO/toluene solvent.

The grain size of the K$_2$CO$_3$(s) should fall within the 100–250 ANSI mesh range.

Additional methods for preparing phenoxyphenysulfones of this general type are disclosed in U.S. Pat. Nos. 3,839,287 and 3,988,374.

The diacid halide or dicarboxylic acid may include an aromatic chain segment selected from the group consisting of:
phenyl; naphthyl; biphenyl;
a polyaryl "sulfone" divalent radical of the general formula:

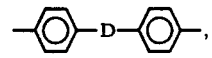

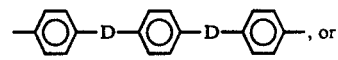

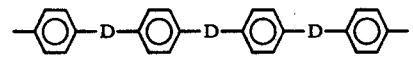

wherein D=—S—, —O—, —CO—, —SO$_2$—, —(CH$_3$)$_2$C, —(CF$_3$)$_2$C—, or mixtures thereof throughout the chain; or a divalent radical having conductive linkages, illustrated by Schiff base compounds selected from the group consisting of:

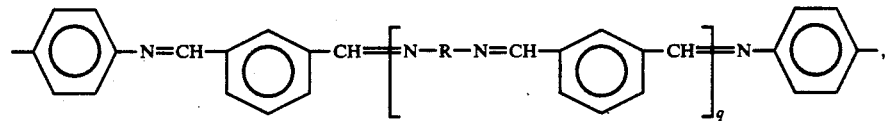

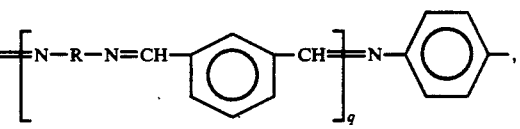

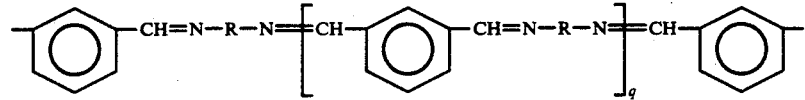

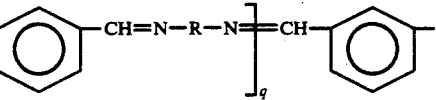

wherein R is selected from the group consisting of: phenyl, biphenyl; naphthyl; or a divalent radical of the general formula:

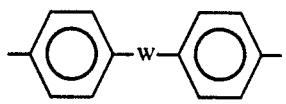

wherein W=—SO$_2$— or —CH$_2$—; and q=0 - 4; or a divalent radical of the general formula:

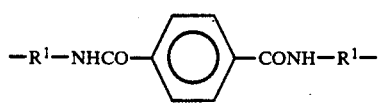

wherein R$^1$ =a C$_2$ to C$_{12}$ divalent aliphatic, alicyclic, or aromatic radical, and, preferably, phenyl (as described in U.S. Pat. No. 4,556,697).

Thiazole, oxazole, or imidazole linkages, especially between aryl groups, may also be used in the conductive or semiconductive oligomers.

The preferred diacid halides include:

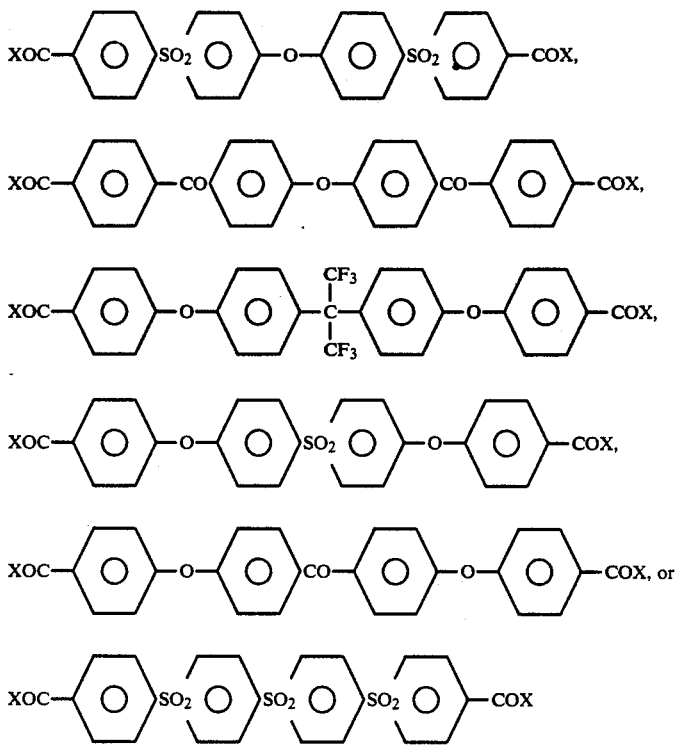

These diacid halides provide the ease of processing characteristics that are desired, particularly if the compounds are used with phenoxyphenyl sulfone diamines.

Schiff base dicarboxylic acids and diacid halides can be prepared by the condensation of aldehydes and aminobenzoic acid (or other amine acids) in the general reaction scheme:

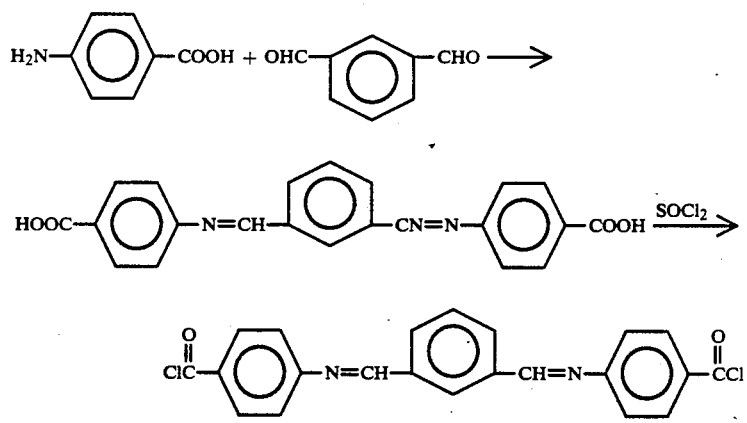

or similar schemes. These diacid halides are not preferred.

Other diacid halides that can be used, but that are not preferred, are disclosed in U.S. Pat. No. 4,504,632, and include:

adipylchloride,
malonyl chloride,
succinyl chloride, glutaryl chloride,
pimelic acid dichloride,
suberic acid dichloride,
azelaic acid dichloride
sebacic acid dichloride
dodecandioic acid dichloride
phthaloyl chloride
isophthaloyl chloride,
terephthaloyl chloride
1.4-naphthalene dicarboxylic acid dichloride, and
4,4'-diphenylether dicarboxylic acid dichloride.

Particularly preferred diacid halides include intermediate "sulfone" linkages to improve toughness of the resulting oligomers. For purposes of this description, "sulfone" linkages include —SO$_2$—, —S—, —CO— and —(CF$_3$)$_2$C—, unless clearly limited to only —SO$_2$—.

The corresponding amideimide characterized by the formula:

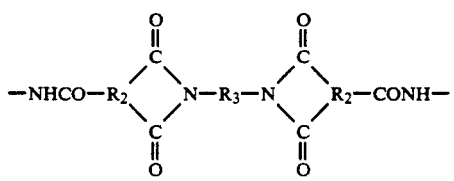

can be prepared if the acid anhydride:

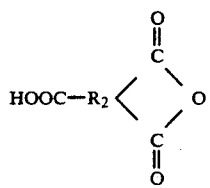

is used instead of the acid halide anhydride. The resulting intermediate products are dicarboxylic acids rather than dianhydrides. These dicarboxylic acids (or their diacid halides) can be reacted with the diamines previously described.

Other dianhydrides for the amideimide synthesis include:
(a) pyromellitic dianhydride,
(b) benzophenonetetracarboxylic dianhydride (BTDA),
(c) 5-(2,5-diketotetrahydrofuryl)-3-methylcyclohexene-1,2-dicarboxylic anhydride (MCTC), and
(d) phenoxyphenyl sulfone dianhydride, but any aromatic or aliphatic dianhydride, such as those disclosed in U.S. Pat. Nos. 3,933,862; 4,504,632; 4,577,034; 4,197,397; 4,251,417; 4,251,418; or 4,251,420, may be used. Mixtures of dianhydrides might be used.

Of course, the dianhydrides also include those intermediates resulting from the condensation of the acid halide anhydride with any of the diamines previously described. Similarly, the dicarboxylic acids and diacid halides include those intermediates prepared by the condensation of the acid anhydride with any of the diamines previously described. The corresponding dicarboxylic acid is converted to the diacid halide (i.e. chloride) is the presence of SOCl$_2$.

The amideimide oligomers of the present invention can be synthesized by several schemes, as previously described. To obtain units of the general formula:

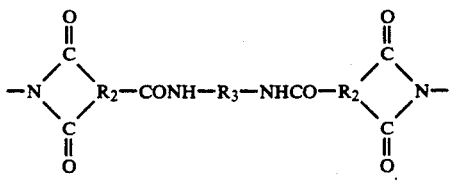

an acid halide anhydride particularly

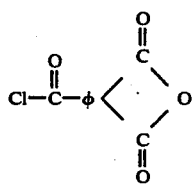

can be mixed with a diamine and with an amine end cap in the ratio of (n+1): n: 2 wherein n=an integer greater than or equal to 1. In this reaction, the acid halide anhydride will react with the diamine to form an intermediate dianhydride which will condense with the diamine and amine end cap. The reaction may be carried out in two distinct stages under which the dianhydride is first prepared by mixing substantially equimolar amounts (or excess diamine) of the acid halide anhydride and diamine followed by the addition of a mixture of the diamine and the end cap. Of course, the diamine used to form the dianhydride may differ from that used in the second stage of the reaction, or it may be a mixture of diamines from the outset.

The related amideimide having units of the general formula:

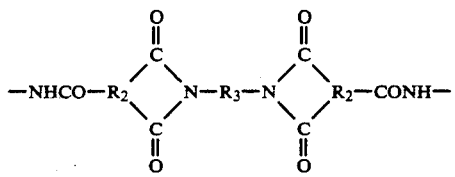

can be synthesized by reacting the acid anhydride with the diamine to form intermediate dicarboxylic acids, which can then react with more diamine, another diamine, or an amine end cap to complete the oligomer. Again, the reaction can be divided into steps.

While use of an amine end cap has been described above, corresponding oligomers can be formed by using an acid halide end cap, if the diamine is provided in excess. In this case the reaction mixture generally comprises the acid halide anhydride or the acid anhydride, the end cap, and the diamine, and the synthesis is completed in one step. Also, a phenolic end cap such as p-nadimidophenol may be employed.

All reactions should be conducted under an inert atmosphere and at elevated temperatures, if the reaction rate needs to be increased. The reaction mixture should be well stirred throughout the synthesis. Chilling the reaction mixture can slow the reaction rate and can assist in controlling the oligomeric product As suggested in U.S. Pat. No. 4,599,383, the diamine may be in the form of its derivative OCN—R—NCO, if desired.

The invention relates broadly to amideimide oligomers. The amideimides described in U.S. Pat. Nos. 4,599,383; 3,988,374; 4,628,079; 3,658,938; and 4,574,144 can all be capped with the crosslinking monomers to convert the polymers to oligomers of the present invention that are suitable for advanced composites.

Suitable end cap monomers include unsaturated hydrocarbons of the general formula:

$$Y_i\text{—R—Q}$$

wherein
i = 1 or 2;

Q = —NH$_2$, —COX or —OH;
X = halogen, preferably chlorine;
R = a phenyl or pyrimidine radical;
Y =

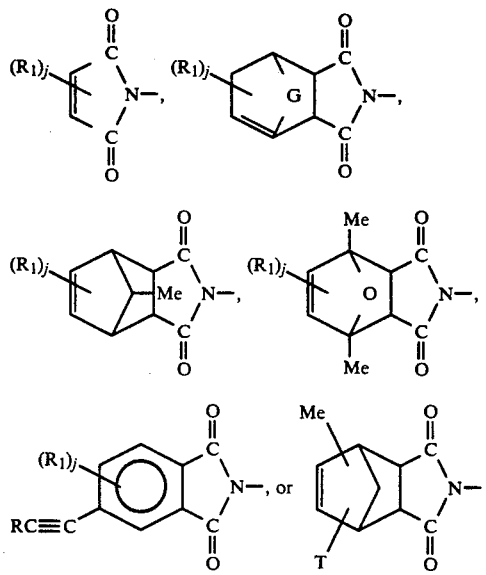

wherein
R$_1$ = lower alkyl, lower alkoxy, aryl, aryloxy, substituted alkyl, substituted aryl, (either including hydroxyl or halo-substituents), halogen, or mixtures thereof; halogen, or mixtures thereof;
j = 0, 1, or, 2;
G = —CH$_2$—, —O—, —S—, —SO$_2$—, —SO—, —CO—, —CHR—, or —CR$_2$—;
R = hydrogen, lower alkyl, or phenyl;
T = methallyl or allyl; and
Me = methyl.

Y can be the same or different or mixtures of amideimide oligomers having different caps selected from the group described above can be made, and this mixture can be used as the sizing provided that the mixed caps have essentially the same curing characteristics.

The end cap monomers are prepared by condensing the respective anhydrides with (H$_2$N)$_2$—R—Q, in the manner described in U.S. Pat. No. 4,604,437 with respect to the allyl- or methallyl-substituted methylbicyclo[2.2.1] hept-5-ene-2,3-dicarboximides. A phenyl counterpart of the halopyrimidine cap can be made using a halo-substituted diaminobenzene.

The aromatic character of the pyrimidine ring should provide substantially the same benefits as the phenyl ring. The thermooxidative stability of the resulting composites, however, might be somewhat less than that achieved for the phenyl end cap monomers.

The amine end cap monomer can be prepared by synthesizing the corresponding acid halide and converting the —COX functionality to an amine through the acid amide in the presence of ammonia, as described in U.S. Pat. No. 4,935,523, or by the direct condensation of 1, 2, 4-, or 1, 2, 5-triaminobenzene with a suitable anhydride, for example.

The pyrimidine precursors are described in U.S. Pat. No. 3,461,461.

While woven fabrics are the typical reinforcement, the fibers can be continuous or discontinuous (in chopped or whisker form). While carbon fiber is most preferred and graphite less preferred, the fiber may also be ceramic, organic, or glass, as suited for the desired application. We have found that improved stability can be achieved using amideimide-sized carbon fibers and oligomers of the type described here or in our other copending patent applications.

Although polyaryl compounds are generally described, aliphatic moieties can be included in the backbones, in some cases, although the ultimate use temperatures of these oligomers or composites may be lower than those oligomers that have entirely polyaryl backbones.

While para isomerization is generally shown, other isomers are possible. Furthermore, the aryl groups can have substituents, if desired, such as halogen, lower alkyl up to about 4 carbon atoms, lower alkoxy up to about 4 carbon atoms, or aryl. Substituents may create steric hindrance problems in synthesizing the oligomers or in crosslinking the oligomers into the final composites.

Mixtures of amideimide polymers and amideimide oligomers can be used as the sizings, but such mixtures are not preferred. When the matrix is an oligomer that includes crosslinking functionalities of the nature suggested for the capped sizings of the present invention, it is probably wise that the caps on the oligomer and on the sizings be the same or at least chemically comparable. That is, we prefer to use nadic caps on our oligomers and nadic caps on the amideimide sizing, particularly those achieved using p-nadimidoaniline

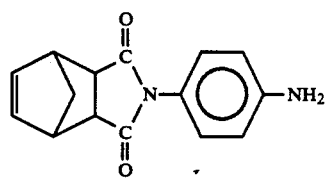

or its difunctional counterpart. In composites having carbon fibers sized with a polyamideimide sizing of the family described herein, the matrices generally are selected from polyimides such as those described in copending application Ser. No. 07/046,376, abandoned in favor of U.S. Pat. No. 5,011,905, polyamides as those described in U.S. Pat. No. 4,876,328, polyamideimides such as those described in U.S. Pat. No. 5,104,967, polyesters such as those described in copending application Ser. No. 07/137,493 filed Dec. 23, 1987 abandon, polysulfones such as described in U.S. Pat. Nos. 4,476,184 and 4,536,559, polyethersulfones such as those described in U.S. Pat. No. 4,414,269, polysulfoneimides, and polybenzoxazoles and heterocycles such as those described in U.S. Pat. Nos. 4,965,336 and 4,868,270, although we believe that the sizing can be used with almost any commercial resin including epoxies, PMR-15, K-3 and the like.

The acid halide anhydride employed in preparing the uncapped linear polyamideimide sizings has the general formula:

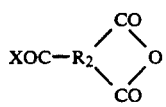

wherein X=halogen; and
R₂=a trivalent organic radical.
A preferred acid halide anhydride is trimellitic anhydride acid chloride. The diamine has the formula:

H₂N—R₃—NH₂ wherein R₃=a divalent organic radical, and can be any of the diamines previously described. The aryl or polyarylsulfone diamines previously described, such as bis(4-aminophenoxyphenyl) sulfone, are preferred.

It is believed that the amideimides of the present invention provide a high concentration of hydrogen bonding sites to promote coupling between the sizing and the matrix. Both the imide and amide linkages include heteroatoms. The capped materials may actually form chemical (covalent) bonds for even stronger interaction between the sizing and matrix, or the end caps might cause addition polymerization to provide even higher MW sizings on the fiber. Such higher MW sizings are believed to have better properties.

Both the uncapped and capped polyamideimides are useful as sizings to impart improved elevated temperature mechanical and environmental stability to carbon fiber/oligomer composites in which the oligomer matrix is composed of any of the oligomers previously described. These sizings are employed in the same manner as conventional sizings and, as shown by the test data presented below, provide improved physical properties to the resulting carbon fiber/oligomer composites.

Multidimensional amideimides, particularly those with relatively long arms, might be used, but they are neither preferred nor recommended.

HYPOTHETICAL EXAMPLES

1. Synthesis of Compound (a)

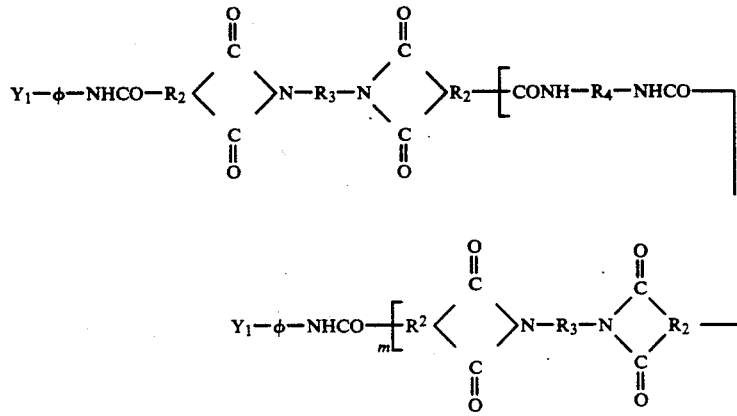

A diamine of the formula H₂N—R₃—NH₂ is reacted with two moles of an acid anhydride of the formula:

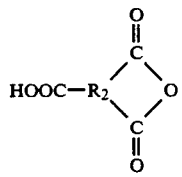

to form a dicarboxylic acid intermediate of the formula:

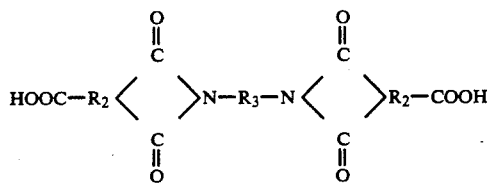

The intermediate is converted to the corresponding diacid chloride in the presence of SOCl₂, which is then condensed with one mole of a diamine of the formula H₂N—R₄—NH₂ and two moles of an amine end cap of the formula Y₁—φ—NH₂ to yield the desired product.

If excess diamine of the formula H₂N—R₄—NH₂ is used along with an acid halide end cap of the formula Yᵢ—φ—COX, the product can have the formula:

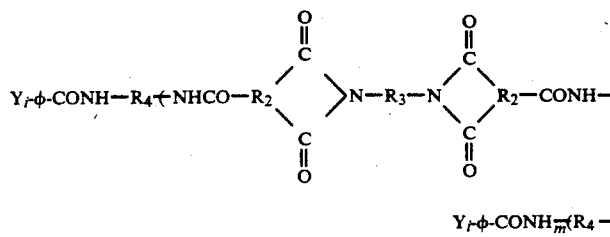

2. Synthesis of compound (b)

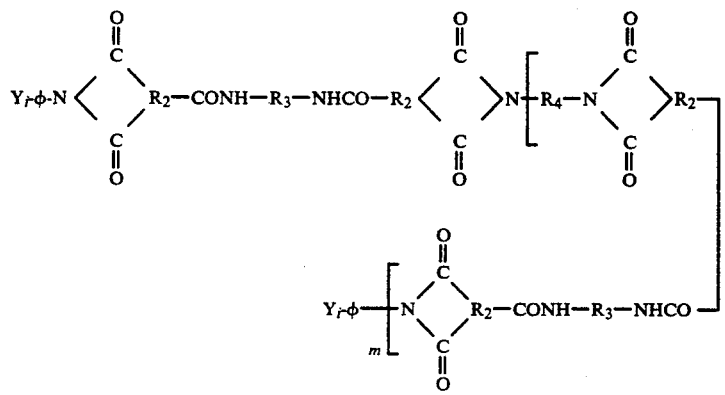

A diamine of the formula $H_2N$—$R_3$—$NH_2$ is reacted with

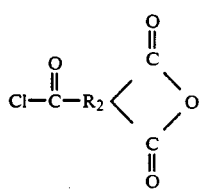

to yield a dianhydride intermediate of the formula:

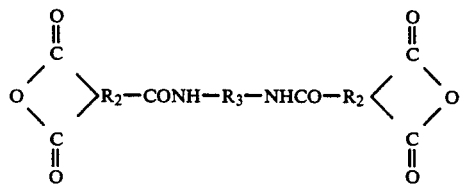

The intermediate is then condensed with $Y_i$—$\phi$—$NH_2$ and a amine of the formula $H_2N$—$R_4$—$NH_2$ to yield the desired

3. Synthesis of compound (c)

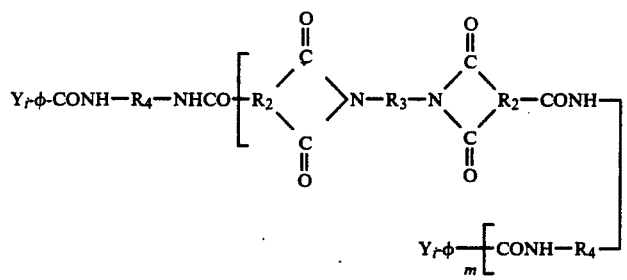

A diamine of the formula $H_2N$—$R_3$—$NH_2$ is reacted with an acid anhydride as in Example 1 to form a dicarboxylic acid intermediate that can be reacted with another diamine of the formula $H_2N$—$R_4$—$NH_2$ and an acid halide end cap of the formula $Y_i$—$\phi$—$COCl$ to yield the desired product.

4. Synthesis of linear oligomers using the same diamine

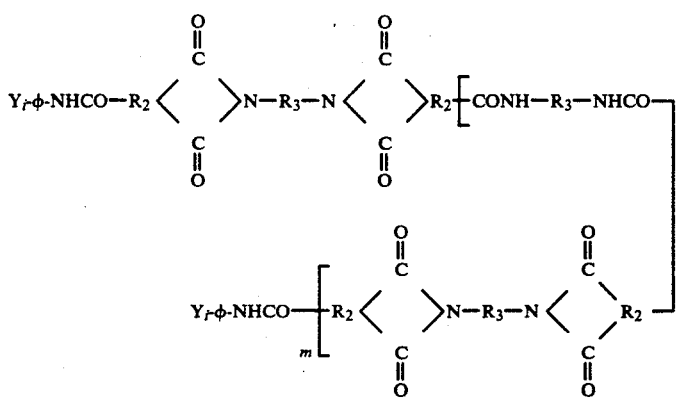

Two moles of an amine end cap are reacted with about $(m+2)$ moles of an acid anhydride, such a phthalyl acid anhydride, and about $(2m+1)$ moles of a diamine, such as $H_2N-\phi-SO_2-\phi-O-\phi-SO_2-\phi-NH_2$, yield the desired product. To avoid side or competitive reactions, it is probably desirable to prepare a dicarboxylic acid intermediate of the formula:

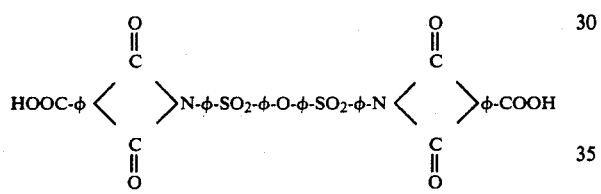

by mixing the acid anhydride and diamine in the ratio of about 2 moles acid anhydride: 1 mole diamine prior to adding the remaining reactants for simultaneous condensation to the oligomer.

Comparable oligomers to those described in the other Examples can be prepared by using the same diamine $H_2N-R_3-NH_2$ in the condensation reaction to prepare the intermediate acids or anhydrides and in the oligomeric condensation. That is, in these oligomers, $R_3$ is the same as $R_4$.

5. Synthesis of a linear amideimide polymer

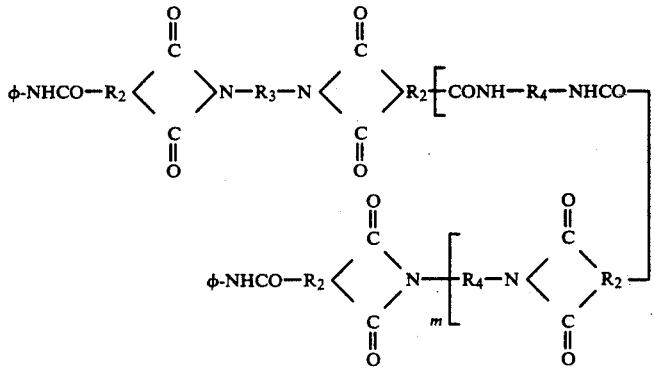

The method of Example 1 is followed except that aniline is substituted for the amine end cap. The product is a comparable polymer of similar formula weight and structure to the oligomer of Example 1 but being incapable of crosslinking because of the lack of crosslinking sites (hydrocarbon unsaturation) in the end caps. The aniline provides MW control and quenches the amideimide condensation.

Comparable noncrosslinking polymers can be obtained according to the methods of Examples 2 or 3 using aniline, benzoic acid, or similar compounds to quench the syntheses, as will be understood by those of ordinary skill. Quenching compounds may not be required.

6. Synthesis of Compound (d)

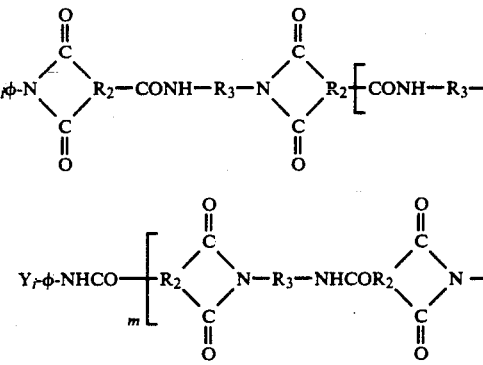

An anhydride acid halide of the formula:

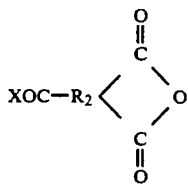

such as trimellitic anhydride acid chloride is added dropwise to a diamine of the formula $H_2N-R_3-NH_2$ so that both imide and amide reactions occur. During the early stages of the condensation, amine functionalities are in great excess to the anhydride acid halide functionalities. To cap this amideimide system, the stoichiometry is adjusted and an amine end cap is added. The synthesis for the capped amideimide oligomer includes 2 moles of amine end cap, n moles diamine and (n+1) moles of the anhydride acid halide.

7. Synthesis of Compound (e)

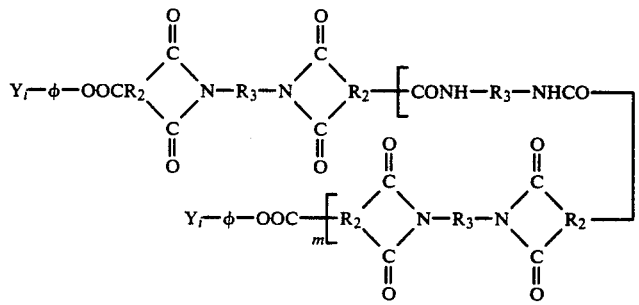

The method of Example 6 is followed except that a phenolic end cap such as p-nadimidophenol is employed. The synthesis for the capped amideimide oligomer includes 2 moles of phenolic end cap, n moles diamine and (n+1) moles of the anhydride acid chloride.

EXAMPLES OF CARBON FIBER SIZINGS

8. Uncapped Linear Polyamideimide

Combine 69.2 grams of bis(4-aminophenoxyphenyl) sulfone and 360 ml of N,N'-dimethylacetamide (DMAC) in a round bottom flask equipped with a mechanical stirrer and nitrogen purge. Cool the solution to −10° C. while stirring and add dropwise 33.69 grams of trimellitic anhydride acid chloride. Stir the solution 1.5 hours and then add 24 ml of triethylamine to the cold flask and continue stirring 4 hours and allow the flask to reach room temperature. Finally, add 120 ml of DMAC, 40 ml of pyridine and 80 ml of acetic anhydride. Stir the mixture overnight at ambient conditions and recover product by blending with 1500 ml of water and filtering. Wash product two additional times using same procedure. Dry the resin at 100° C. Reduced Viscosity=0.6105 (Literature value=0.97) in DMAC.

9. Linear polyamideimide Oligomer

Dissolve 1.70 grams of p-nadimidoaniline and 71.85 grams of bis(4-aminophenoxyphenyl) sulfone in 374 grams of N,N'-dimethylacetamide. Cool the solution to −10° C. under nitrogen. While stirring, add 35.68 grams of trimellitic anhydride acid chloride dropwise and hold the temperature below 0° C. one hour. Next add 18.01 grams of triethylamine drop wise and stir 30 minutes. Add 124 grams of N,N'-dimethylacetamide and stir 3 more hours. Finally, add 17 grams of pyridine and 34 grams of acetic anhydride. Stir the viscous mixture 3 hours. Filter off the hydrochloride salt and precipitate the product in a blender with water. Filter, wash the precipitate with distilled water and then dry.

EXAMPLE 10

Flexural stress analysis tests were run on the uncapped linear polyamideimide sizing of Example 8 and on NR150 and NMP polyimide sizings available from DuPont/BASF. As shown in Table 1 below, G40 carbon fibers from BASF were sized with NR150 and NMP polyimide sizings and composites having fibers sized with these sizings were compared with composites having fibers sized with the uncapped linear polyamideimide sizing of Example 8. In each of these composites, the matrix resin was PMR-15.

TABLE 1

| SIZING | | FLEXURAL PROPERTIES Flexural Stress (ksi) and Modulus (MSI) | | | RESIN CONTENT | | |
|---|---|---|---|---|---|---|---|
| | | Control | 3520 Hrs | 5020 Hrs | Control | Aged 3520 Hrs | Aged 5020 Hrs |
| NR150 | | | (2.73%)* | (4.74)* | 31.5 | 31.4 | 31.3 |
| | AMBIENT | 248.2/29.4 | 185.9/21.8 | 129.5/19.7 | | 60.3 | 60.4 |
| | 550° F. | 118.4/29.5 | 124.2/20.1 | 100.4/18.4 | | | |
| NMP | | | (2.73%)* | (4.62)* | 35.3 | 28.6 | 28.4 |
| | AMBIENT | 191.5/20.3 | 196.1/21.9 | 166.4/20.2 | | 63.2 | 62.7 |
| | 550° F. | 101.9/19.7 | 126.3/19.2 | 102.0/17.0 | | | |
| EXAMPLE 8 | | | (2.73%)* | (4.90)* | 36.5 | 32.1 | 33.3 |
| | AMBIENT | 182.9/20.1 | 195.3/21.6 | 169.2/19.7 | | 59.9 | 58.4 |
| | 550° F. | 94.8/19.9 | 139.0/19.9 | 111.6/17.1 | | | |

*Actual weight loss of panel tested

It will be noted that at the elevated temperature of 550° F., the composites with the two polyimide sizings had flexural stresses of about 100 ksi wile the composite with the amidimide sizing of the present invention had a flexural stress of 111.6 ksi, at least 10% greater.

Table 2 below shows the weight loss of the three composites tested at various aging periods. The values given in parentheses are the normalized values, standardizing the masses of the samples. The composites sized with the polyimide sizings failed between 5000 and 6000 hours while the composite with the amideimide sizing of the present invention was usable beyond 6000 hours.

TABLE 2

| | WEIGHT LOSS DATA | | | | | | | | | | | |
|---|---|---|---|---|---|---|---|---|---|---|---|---|
| | ISOTHERMAL AGING AT 550° F. - HOURS | | | | | | | | | | | |
| SIZING | 100 | 504 | 1108 | 1680 | 2180 | 2680 | 3180 | 3520 | 4020 | 4520 | 5020 | 5520 |
| NR150 | 0.35 | 0.62 | 0.85 | 1.18(1.12) | 1.67(1.59) | 1.92(1.83) | 2.31(2.20) | 2.74(2.60) | 3.33(3.17) | 4.01(3.82) | 4.82(4.59) | 5.48(5.22) |
| NMP | 0.35 | 0.68 | 0.91 | 1.24(1.05) | 1.65(1.40) | 1.98(1.68) | 2.37(2.01) | 2.80(2.38) | 3.44(2.92) | 4.16(3.54) | 4.95(4.22) | 5.88(5.00) |
| EX. 8 | 0.36 | 0.66 | 0.91 | 1.24(1.01) | 1.58(1.30) | 2.01(1.65) | 2.43(2.00) | 2.89(2.37) | 3.60(2.96) | 4.35(3.57) | 5.21(4.28) | 6.20(5.10) |

FIG. 1 records the mechanical properties of the three composites through more than 6000 hours. The results shown in the left sets of columns are for samples kept at ambient temperature and the results shown in the right three sets of columns are for samples tested at 550° F. It will be noted that the composite sized with the amideimide sizing of the present invention had physical properties at 6000 hours comparable to those of the composites with the two polyimide sizings at 5000 hours, thereby providing a 15-20% extension in the life of the composite.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill based upon this description. The examples are given to illustrate the invention and not intended to limit it. Accordingly, the claims should only be limited as is necessary in view of the pertinent prior art.

What is claimed is:

1. Carbon fibers sized with a linear polyamideimide comprising repeating units having the general formula:

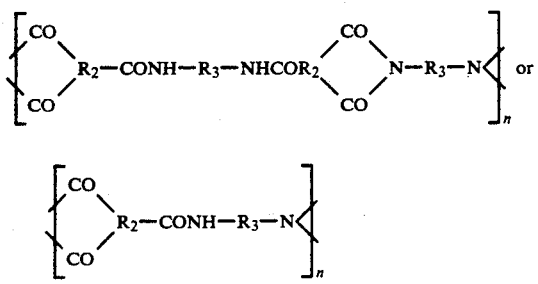

wherein
$R_2$ = a trivalent organic radical;
$R_3$ = a divalent organic radical; and
n = a small integer.

2. The sized carbon fibers of claim 1 wherein $R_2$ is benzenetriyl.

3. The sized carbon fibers of claim 1 wherein $R_3$ is phenylene.

4. The sized carbon fibers of claim 1 wherein $R_3$ is —φ—O—φ—SO$_2$—φ—O—φ— wherein φ is phenylene.

5. Carbon fibers sized with a linear polyamideimide which is the product formed by reacting in a suitable solvent under an inert gas atmosphere a mixture comprising:
(a) an acid halide anhydride of the formula:

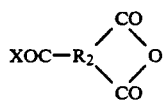

wherein
X = halogen; and
$R_2$ = a trivalent organic radical; and
(b) a diamine of the formula:

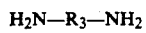

wherein
$R_3$ = a divalent organic radical

6. The sized carbon fibers of claim 5 wherein $R_2$ is benzenetriyl.

7. The sized carbon fibers of claim 5 wherein $R_3$ is phenylene or —φ—O—φ—SO$_2$—φ—O—φ— wherein φ is phenylene.

8. The sized carbon fibers of claim 5 wherein said acid halide anhydride is trimellitic anhydride acid chloride.

9. The sized carbon fibers of claim 5 wherein said diamine has the general formula:

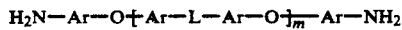

wherein
Ar = an aromatic radical;
L = a sulfone linkage selected from the group consisting of —SO$_2$—, —S—, —CO—, —(CH$_3$)$_2$C—, and —(CF$_3$)$_2$—; and
m = a small integer greater than or equal to 1.

10. The sized carbon fibers of claim 5 wherein said diamine is bis(4-aminophenoxyphenyl) sulfone.

11. Carbon fibers sized with a polyamideimide oligomer, said oligomer being selected from the group consisting of:

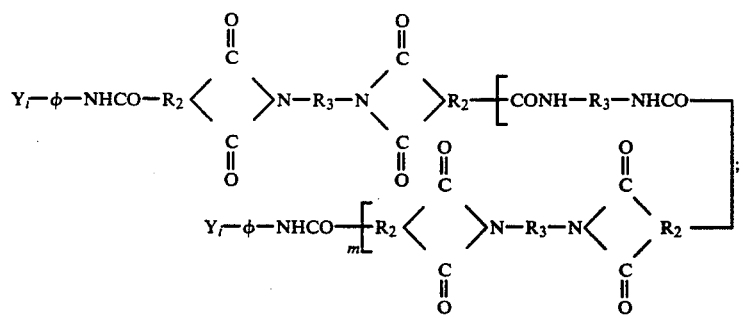
(a)
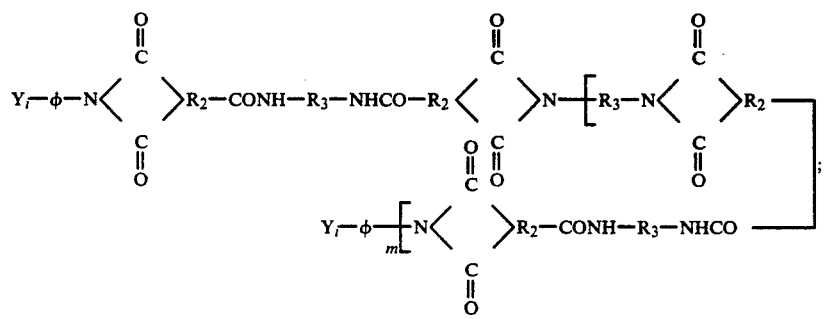
(b)
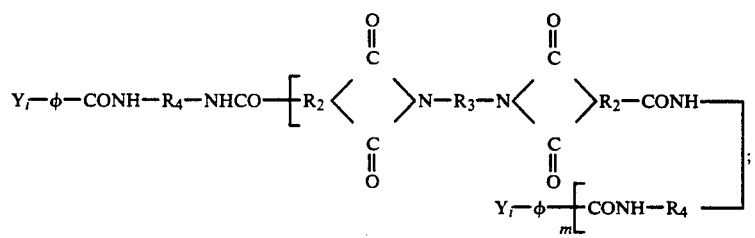
(c)
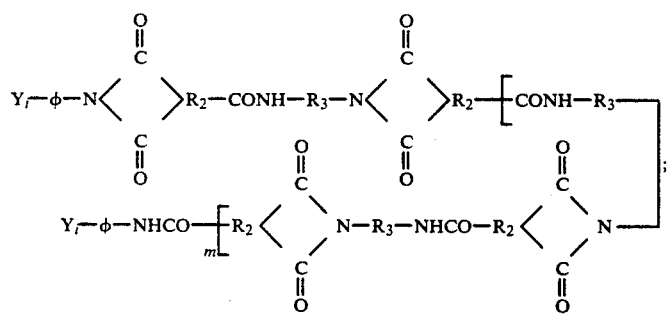
(d)
and
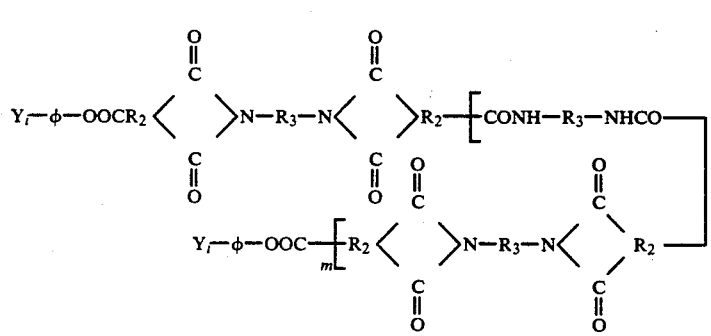
wherein Y = wherein
- $R_1$ = lower alkyl, lower alkoxy, aryl, aryloxy, substituted alkyl, substituted aryl, halogen, or mixtures thereof;
- j = 0, 1, or 2;
- i = 1 or 2;
- G = —CH$_2$—, —O—, —S—, —SO$_2$—, —SO—, —CO—, —CHR—, or —CR$_2$—;
- T = methallyl or allyl;
- Me = methyl;
- R = hydrogen, lower alkyl, or phenyl;
- $R_2$ = a trivalent organic radical;
- $R_3$ = a divalent organic radical; and
- m = a small integer.

12. The sized carbon fibers of claim 11 wherein $R_2$ is benzenetriyl.

13. The sized carbon fibers of claim 11 wherein $R_3$ is phenylene or $\phi$—O—$\phi$—SO$_2$—$\phi$—O—$\phi$— wherein $\phi$ is phenylene.

14. The sized carbon fibers of claim 11 wherein the oligomer is selected from the group consisting of (a) and (b).

15. The sized carbon fibers of claim 11 wherein said oligomer is formed by the reaction of trimellitic anhydride acid chloride, bis(4-amino-phenoxyphenyl) sulfone and p-nadimidoaniline.

* * * * *

UNITED STATES PATENT AND TRADEMARK OFFICE
CERTIFICATE OF CORRECTION

PATENT NO. : 5,239,046

DATED : August 24, 1993

INVENTOR(S) : Hyman R. Lubowitz, Clyde H. Sheppard and Ronald R. Stephenson

It is certified that error appears in the above-identified patent and that said Letters Patent is hereby corrected as shown below:

In the ABSTRACT, on page 2, the second chemical structure at the bottom of the first column should read

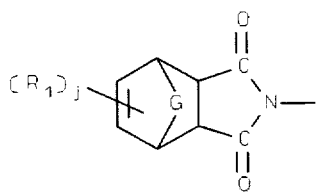

In column 4, lines 55-60, the second chemical structure should read

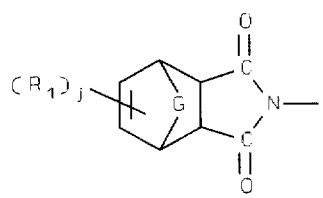

In column 5, lines 62-67, the second chemical structure should read

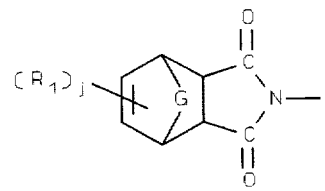

In column 14, line 42, "-(CH$_3$)$_2$C," should read -- -(CH$_3$)$_2$C-, --.

UNITED STATES PATENT AND TRADEMARK OFFICE
CERTIFICATE OF CORRECTION

PATENT NO. : 5,239,046

DATED : August 24, 1993

INVENTOR(S) : Hyman R. Lubowitz, Clyde H. Sheppard and Ronald R. Stephenson

It is certified that error appears in the above-identified patent and that said Letters Patent is hereby corrected as shown below:

In column 19, lines 16-22, the second chemical structure should read

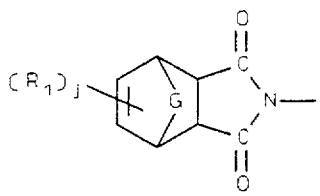

In column 22, lines 7-27, the chemical structure should read

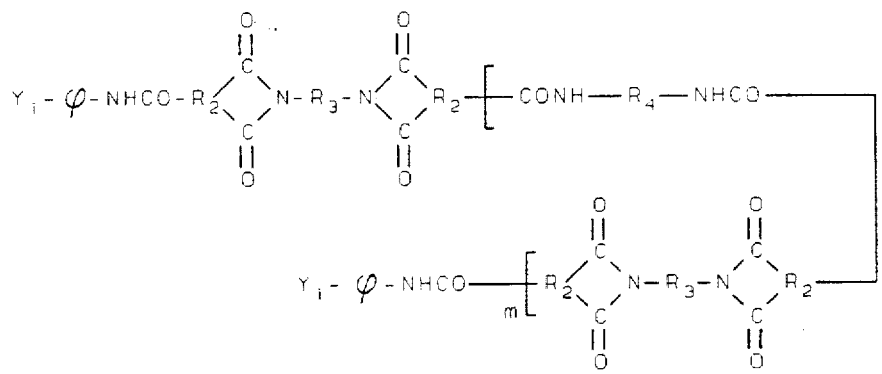

In column 24, line 39, after "desired" please add -- product. --.

In column 31, claim 11, line 55, across from "and" should read --(e)--.

UNITED STATES PATENT AND TRADEMARK OFFICE
CERTIFICATE OF CORRECTION

PATENT NO. : 5,239,046

DATED : August 24, 1993

INVENTOR(S) : Hyman R. Lubowitz, Clyde H. Sheppard and Ronald R. Stephenson

It is certified that error appears in the above-identified patent and that said Letters Patent is hereby corrected as shown below:

In column 33, claim 11, lines 1-6, the second chemical structure should read

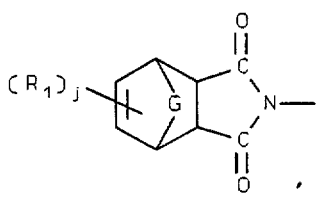

Signed and Sealed this

Twenty-second Day of July, 1997

Attest:

BRUCE LEHMAN

Attesting Officer

Commissioner of Patents and Trademarks